Figure 1:
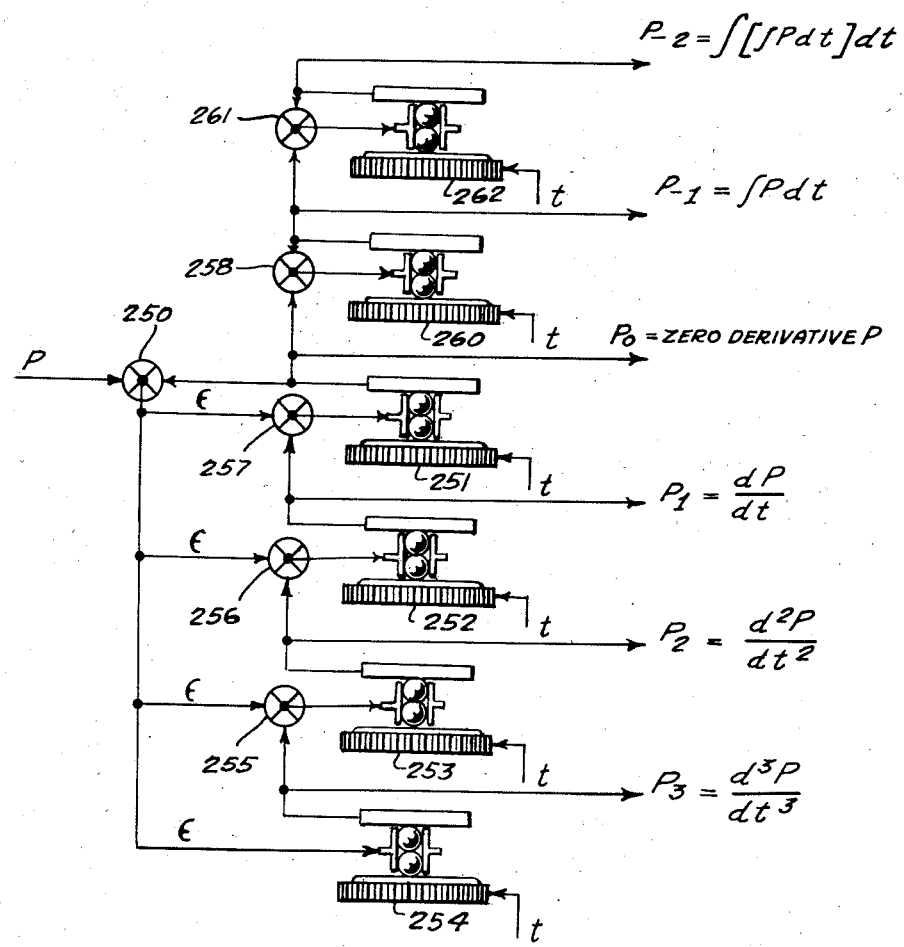

May 26, 1959 W. H. NEWELL ET AL 2,888,195
DEVICE FOR PREDICTING VALUES OF A FLUCTUATING
SYSYTEM AT A PREDETERMINED FUTURE TIME
Original Filed May 29, 1953 3 Sheets-Sheet 3

INVENTORS
WILLIAM H. NEWELL
EDWARD G. BURGESS
NORMAN J. ZABB
STAMATES I. FRANGOULIS
BY Victor D. Borst
ATTORNEY United States Patent Office 2,888,195
Patented May 26, 1959

2,888,195

DEVICE FOR PREDICTING VALUES OF A FLUCTUATING SYSTEM AT A PREDETERMINED FUTURE TIME

William H. Newell, Mount Vernon, Edward G. Burgess, Jr., Kew Gardens, Norman J. Zabb, Brooklyn, and Stamates I. Frangoulis, Flushing, N.Y., assignors to Sperry Rand Corporation, a corporation of Delaware Original application May 29, 1953, Serial No. 358,324. Divided and this application February 28, 1955, Serial No. 490,765

6 Claims. (Cl. 235—61)

The present application is a division of application Serial No. 358,324, filed May 29, 1953.

The present invention relates to a method and apparatus for computing the characteristics of a fluctuating system continuously for successive future periods, and although it has a wide range of utility, it is particularly useful in predicting the future pitch angle (deck tilt) and the future heave (level) at a future time of a floating platform, such as the flight deck of a carrier.

In guiding an airplane in its approach towards a floating platform, such as the deck of a carrier for landing, it is necessary to predict the time of landing and the pitch angle and heave of the deck at the predicted time to assure safe landing. Since the carrier is continuously oscillating in pitch and has a continuous oscillating vertical movement during the approach of the airplane, it becomes necessary to compute continuously the characteristics of the fluctuating motions of the carrier and to predict therefrom the pitch and heave of the carrier at the future predicted time of landing. Since the movement of the deck does not follow a uniform mathematical pattern or equation, it is seen that the matter of determining with accuracy the pitch and heave at a future time is not a simple problem.

One object of the present invention is to provide a novel method and device by which the characteristics of a fluctuating system may be computed and predicted continuously for successive future periods, even though the form of the system may be continuously varying and the variations in the system may not be following continuously any predetermined mathematical pattern or equation.

Another object is to provide a novel method and device by which the future pitch angle of a floating platform, such as the flight deck of a carrier, at the expected future instant of landing can be computed and predicted.

A further object is to provide a novel method and device by which the future heave or flight deck level of a floating platform, such as that of a carrier at the expected future instant of landing can be computed and predicted.

In accordance with the present invention, the value of a quantity in a fluctuating system at a future predetermined time is determined continuously by continuously determining successive integrals and successive derivatives of the present value of the quantity, and from said integrals and said derivatives continuously predicting said future value.

In its more specific aspects, the invention is employed for continuously predicting the pitch angle and heave of a floating platform at a future predetermined time, and comprises continuously determining successive integrals and successive derivatives of the present pitch angle and present heave, and from said integrals and said derivatives, continuously predicting said future pitch angle and future heave.

Figure 2:
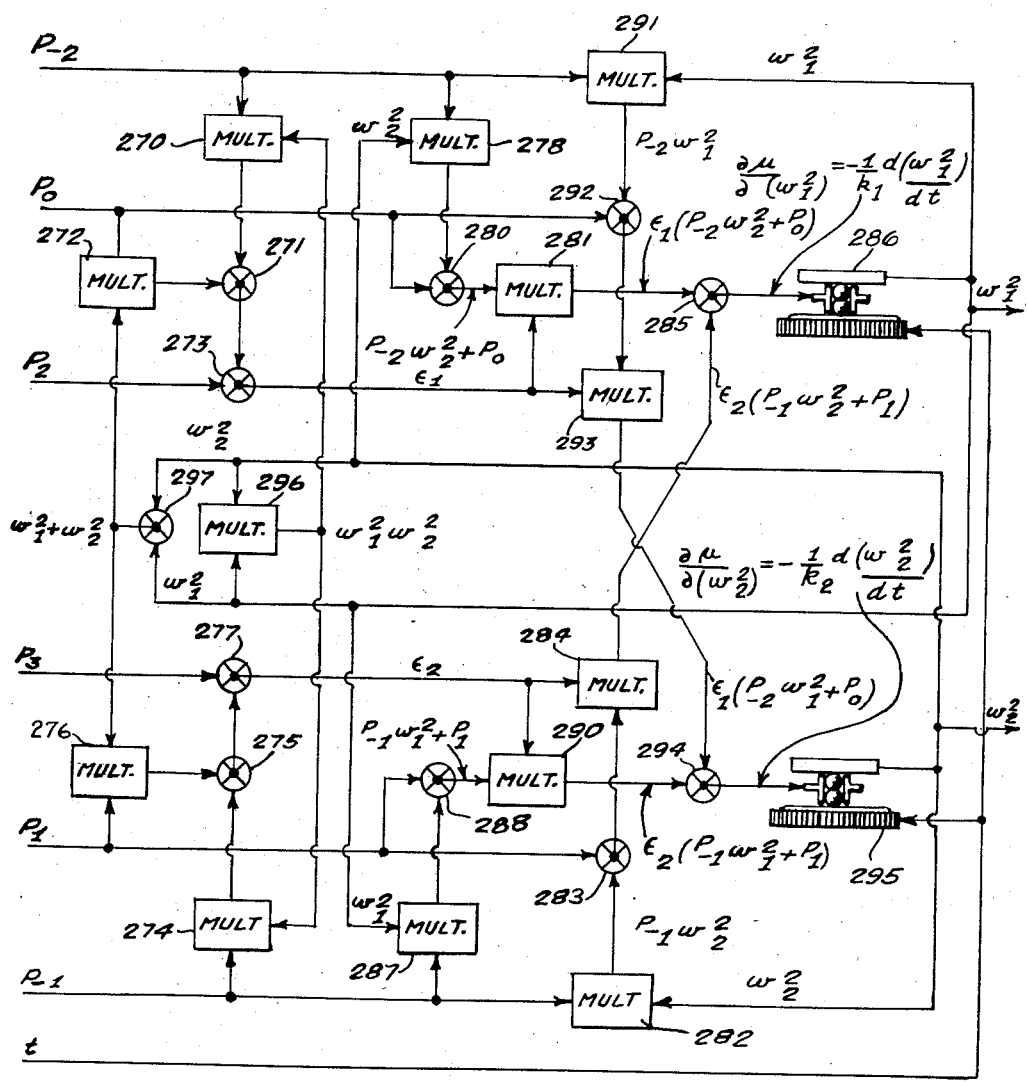
Figure 3:
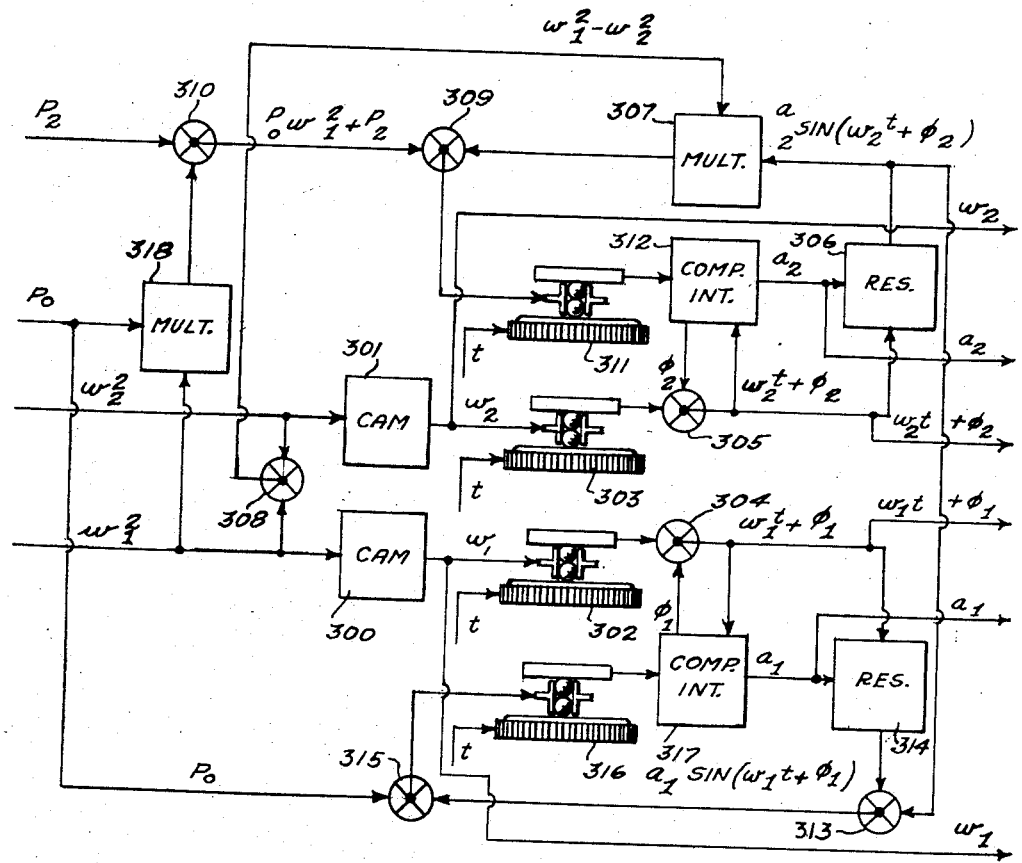
Figure 4:
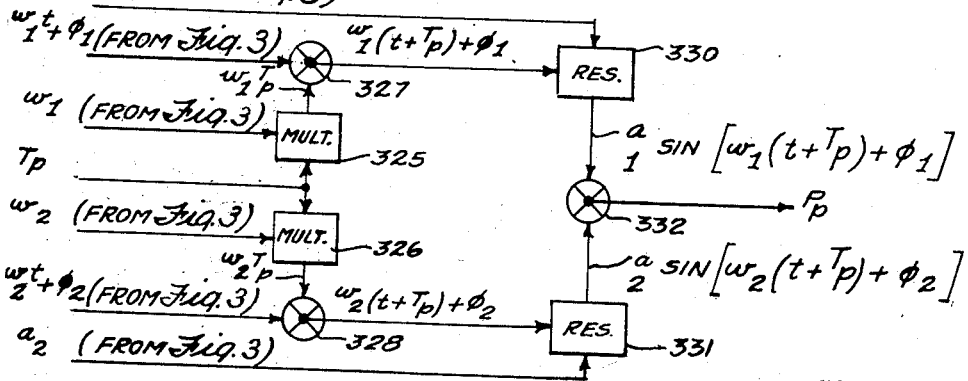

Various other objects, features and advantages of the invention are apparent from the following description and from the accompanying drawings, in which Fig. 1 is a diagram of a mechanism for obtaining the pitch angle integrals and derivatives for use in connection with a form of pitch predicting system embodying the present invention, the full lines in said diagram indictating mechanical movements such as shaft rotations;

Fig. 2 is a diagram of an angular velocity solver for obtaining the values of angular velocities of the sine waves constituting components of the assumed motion of pitch for use in connection with a pitch prediction system employing integrals and derivatives of the pitch angle, the full lines in said diagram representing mechanical movements such as shaft rotations;

Fig. 3 is a diagram of a sine wave component synthesizer for obtaining the values of amplitudes and phase angles of the sine waves constituting components of the assumed motion of pitch for use in connection with a pitch prediction computer employing integrals and derivatives of the pitch angle, the full lines in said diagram representing mechanical movements such as shaft rotations; and Fig. 4 is a diagram of a pitch prediction computer for obtaining the predicted pitch angle from the values derived from the mechanisms of Figs 1, 2 and 3, the full lines in said diagram representing mechanical movements such as shaft rotations.

To predict the position of a ship's deck at the future instant of landing of an approaching plane, it is required that the time ahead when the plane is expected to land be predicted and then that the position of the deck at this time be predicted. This sequence of predictions is based on the assumption that the pilot has sole control of the plane speed and that the position of the deck at touchdown (the position on the deck where the plane can begin to land) is not preselected.

The time required by a plane to fly from its present position to its position at touchdown on the deck indicated herein by the symbol $T_p$, can be calculated by a prediction time computer in the manner described in the aforesaid copending application. For computing the predicted pitch angle of the deck at the predicted time $T_p$ of landing indicated by the symbol $P_p$ and the predicted deck height at the predicted time $T_p$ indicated by the symbol $H_p$, it is necessary to determine continuously the present pitch angle of the deck indicated by the symbol P and the present deck height indicated by the symbol H.

To supply continuously information on the magnitude of the present ship pitch angle, service of a stable element is required. This stable element could be of any well-known construction. For example, it could be one of the stable elements commonly employed in connection with firing control systems in warships. There is also the possibility that the stabilizer unit required in connection with the radar antenna drive could also be used to supply continuously the information P.

Having determined a value for the prediction time $T_p$, the second phase of the prediction problem is entered into, namely the deck tilt $P_p$ at the future time $T_p$. Consider first a ship at rest in still water. If now a moment should be applied about an athwartship axis through the center of gravity, some pitch angle, say P would result. Upon removal of this applied moment, the ship would oscillate in pitch about the athwartship axis with decreasing amplitude, the equation of motion being approximately $$I\ddot{P}+C\dot{P}+KP=0 \qquad (18)$$

where I is the effective longitudinal moment of inertia of the ship about the athwartship pitch axis, C is the damping moment coefficient due to skin friction and the like, K is the hydraulic restoring moment coefficient, $\ddot{P}$ is the second derivative of the pitch angle, with respect to time and $\dot{P}$ is the first derivative of the pitch angle with respect to time. Now the period of this oscillation is the pitching period of the ship and is equal to $$T = \frac{2\pi}{w_{np}} = \frac{2\pi}{\sqrt{\frac{K}{I} - \frac{C^2}{4I^2}}}$$

where $w_{np}$=natural angular frequency of pitch. However, when the ship is in a seaway, the equation of motion (18) becomes $$I\ddot{P} + C\dot{P} + KP = F(t)$$

where $F(t)$ represents the pitch component of the moment applied to the ship by wave action. Now from general observation, it can be said that $F(t)$, although highly variable, will nevertheless at a given hour exhibit a frequency spectrum in which certain narrow bands of frequencies are predominant. From an analyzed recording of pitch angle of various type ships headed into the wind under different sea conditions over extended periods of time, it would be possible to obtain the frequency spectrum of the ship's pitching motion under the conditions existing at the time of the run. From this data, it would be noted that the frequencies of greatest amplitude would correspond to the natural pitch period of the ship, the periods at which the ship is encountering the particular wave systems running at the time, the period of ship roll and the period of heave. The last two periods mentioned would probably be of small import and are included only because of the fact that bot hrolling and heaving cause an induced pitch. Usually, but not always, there will be a single system of waves running. Furthermore, this system of waves will more often than not be running in nearly the same direction as the wind. Hence, the normal expectation during carrier landing operations is that the ship would be headed in a direction about opposite to that in which the waves are traveling. Considering that the usual period of ocean waves is in the range of 5 to 10 seconds, a ship speed of 25 knots would reduce these periods to the range of 1.8 to 5.5 seconds. It almost seems from these considerations that under such conditions, the only period to be seriously considered in pitch motion would be the natural pitch period. That is, a forcing moment function of 2 second period would have to be of tremendous magnitude to appreciably affect the ship motion in pitch. However, a forcing function of 5 second period might well have an appreciable effect, and of course a longer period forcing function would have still greater influence. Functions having such longer periods would arise if the normal conditions outlined above did not hold—as for example, when the wind is opposite in direction to the sea and the ship is traveling with a following sea.

From the above discussion, it is evident that an exact solution for the equation of motion of the ship is not possible. However, the equation of motion may be represented with sufficient accuracy by the approximation $$I\ddot{P} + KP = F(t) = a \sin(wt + \phi)$$

where $F(t)$ is a sine function of unknown amplitude $a$, angular frequency $w$ and phase angle $\phi$. The solution of this differential equation is then of the form $$P = a_1 \sin(w_1 t + \phi_1) + a_2 \sin(w_2 t + \phi_2) \quad (20)$$

where $w_1$ and $w_2$ being the unknown angular velocities and $\phi_1$ and $\phi_2$ the phase angles of the simple harmonic motions of which the pitch angle is assumed to be composed. This form, involving the six unknown parameters $a_1$, $a_2$, $w_1$, $w_2$, $\phi_1$ and $\phi_2$ therefore represents the time variations of pitch angle. Hence, if these six unknowns and variable parameters can be continuously determined and furthermore if a continuous value of prediction time $T_p$ is available, then the predicted pitch angle is $$P_p = a_1 \sin[w_1(t+T_p)+\phi_1] + a_2 \sin[w_2(t+T_p)+\phi_2] \quad (21)$$

The problem is now therefore reduced to the continuous determination of the six unknown and variable parameters noted above.

It is mechanically feasible to obtain accurate values of derivatives or integrals of P (present pitch angle). Having available the value of P and the values of five derivatives or integrals of P, it is possible to determine the angular velocities, $w_1$ and $w_2$, of the two sine wave components composing the assumed motion of P. From the quantities $w_1$ and $w_2$, it is then possible either mathematically or mechanically to determine the amplitudes and phase angles of the two sine wave components which approximate the actual motion. This process is carried out continuously so that the approximation is continuously being revised.

Adopting the Formula 20 for the pitch angle of a carrier deck as follows:

$$P = a_1 \sin(w_1 t + \phi_1) + a_2 \sin(w_2 t + \phi_2) \quad (20)$$

we can write the series of equations representing integrals and derivatives of P, namely $$\int\left[\int P\,dt\right]dt = P_{-2} = -\left(\frac{a_1}{w_1^2}\right)\sin(w_1 t + \phi_1) - \left(\frac{a_2}{w_2^2}\right)\sin(w_2 t + \phi_2) \quad (63)$$

$$\int P\,dt = P_{-1} = -\left(\frac{a_1}{w_1}\right)\cos(w_1 t + \phi_1) - \left(\frac{a_2}{w_2}\right)\cos(w_2 t + \phi_2) \quad (64)$$

$$P = P_0 (\text{zero derivative}) = a_1 \sin(w_1 t + \phi_1) + a_2 \sin(w_2 t + \phi_2) \quad (65)$$

$$\frac{dP}{dt} = P_1 = (a_1 w_1)\cos(w_1 t + \phi_1) + (a_2 w_2)\cos(w_2 t + \phi_2) \quad (66)$$

$$\frac{d^2P}{dt^2} = P_2 = -(a_1 w_1^2)\sin(w_1 t + \phi_1) - (a_2 w_2^2)\sin(w_2 t + \phi_2) \quad (67)$$

$$\frac{d^3P}{dt^3} = P_3 = -(a_1 w_1^3)\cos(w_1 t + \phi_1) - (a_2 w_2^3)\cos(w_2 t + \phi_2) \quad (68)$$

We may eliminate $a_2 \sin(w_1 t + \phi)$ and $a_2 \sin(w_2 t + \phi_2)$ from Equations 63, 65, and 67 and likewise $a_1 \cos(w_1 t + \phi_1)$ and $a_2 \cos(w_2 t + \phi_2)$ from Equations 64, 66, and 68, thereby obtaining the two relations $$P_{-2} w_1^2 w_2^2 + P_0(w_1^2 + w_2^2) + P_2 = 0 \quad (69)$$

and $$P_{-1} w_1^2 w_2^2 + P_1(w_1^2 + w_2^2) + P_3 = 0 \quad (70)$$

where the P's are observed quantities, while $w_1$ and $w_2$ are the required unknown angular velocities.

An automatic mechanism suitable for the continuous determination of $w_1$ and $w_2$ from variable input P's is shown schematically in Figure 2. The stability of action of the feedback employed in this mechanism may be analyzed in the following manner. Suppose initially that the mechanism values of $w_1^2$ and $w_2^2$ are such that the Relations 69 and 70 are not satisfied, so that $$P_{-2} w_1^2 w_2^2 P_0(w_1^2 + w_2^2) + P_2 = \epsilon_1 \quad (69a)$$

$$P_{-1} w_1^2 w_2^2 + P_1(w_1^2 + w_2^2) + P_3 = \epsilon_2 \quad (70a)$$

where $\epsilon_1$ and $\epsilon_2$ represent error signals which must be used in some manner to continuously readjust the mechanism values of $w_2^2$ and $w_2^2$ so that the Relations 69 and 70 are always more exactly satisfied. Thus we require that the feed-back be such that $\epsilon_1$ and $\epsilon_2$ rapidly approach zero with increasing time. One method of achieving stable feed-back operation, is as follows: Let us assume the auxiliary quantity $$\mu = \epsilon_1^2 + \epsilon_2^2 \qquad (71)$$

Then $$\frac{d\mu}{dt} = \frac{\partial \mu}{\partial(w_1^2)} \cdot \frac{d(w_1^2)}{dt} + \frac{\partial \mu}{\partial(w_2^2)} \cdot \frac{d(w_2^2)}{dt}$$

We may then design the mechanism, so that the adjusting feed-backs are $$\frac{d(w_1^2)}{dt} = -k_1 \frac{\partial \mu}{\partial(w_1^2)} \qquad (72)$$

and $$\frac{d(w_2^2)}{dt} = -k_2 \frac{\partial \mu}{\partial(w_2^2)} \qquad (73)$$

where $K_1$ and $K_2$ are positive sensitivity constants.

Hence $$\frac{d\mu}{dt} = -k_1 \left[\frac{\partial \mu}{\partial(w_1^2)}\right]^2 - k_2 \left[\frac{\partial \mu}{\partial(w_2^2)}\right]^2$$

so $$\frac{d\mu}{dt}$$

is always negative or zero. Under the conditions existing in the mechanism, the limit of $\mu$ is zero with increasing time. From the Relations 69a and 70a and the expression $\mu = \epsilon_1^2 + \epsilon_2^2$, we get $$\frac{\partial \mu}{\partial(w_1^2)} = 2\epsilon_1 \frac{\partial \epsilon_1}{\partial(w_1^2)} + 2\epsilon_2 \frac{\partial \epsilon_2}{\partial(w_1^2)}$$

or $$\frac{\partial \mu}{\partial(w_1^2)} = 2\epsilon_1(P_{-2}w_2^2 + P_0) + 2\epsilon_2(P_{-1}w_2^2 + P_1) \qquad (74)$$

and $$\frac{\partial \mu}{\partial(w_2^2)} = 2\epsilon_1(P_{-2}w_1^2 + P_0) + 2\epsilon_2(P_{-1}w_1^2 + P_1) \qquad (75)$$

The condition that $$\frac{\partial \mu}{\partial(w_1^2)}$$

and $$\frac{\partial \mu}{\partial(w_2^2)}$$

both be equal to zero with $\epsilon_1$ and $\epsilon_2$ not equal to zero is $$(P_{-1}w_1^2 + P_1)(P_{-2}w_2^2 + P_0) - (P_{-1}w_2^2 + P_1)(P_{-2}w_1^2 + P_0) = 0$$

or $$(w_1^2 - w_2^2)(P_1 P_{-2} - P_0 P_{-1}) = 0 \qquad (76)$$

Here if $w_1 \neq w_2$, then $(P_1 P_{-2} - P_0 P_{-1}) = 0 \qquad (77)$

That is, $P_1 P_{-2} - P_0 P_{-1}$ can be zero only momentarily if $w_1 \neq w_2$. Accordingly, the solution in this case is not prevented from converging. However, when $w_1 = w_2$, we may have $$\frac{d(w_1^2)}{dt}$$

and $$\frac{d(w_2^2)}{dt}$$

both equal to zero when $\epsilon_1$ and $\epsilon_2$ are both not equal to zero. In this case $\epsilon_1$ and $\epsilon_2$ would not converge to zero as required, since the adjusting feedback would be zero. The conditions of (76), namely $w_1 = w_2$ or $P_1 P_{-2} = P_0 P_{-1}$ do not imply $$\frac{\partial \mu}{\partial(w_1^2)}$$

and $$\frac{\partial \mu}{\partial(w_2^2)}$$

must both be equal to zero but simply that they both could be equal to zero with appropriate non-zero values of $\epsilon_1$ and $\epsilon_2$. Thus, failure of the mechanism to converge due to $w_1 = w_2$ would appear to be a very remote contingency. Furthermore, if $w_1 \neq w_2$, then it is impossible that $$\frac{\partial \mu}{\partial(w_1^2)}$$

and $$\frac{\partial \mu}{\partial(w_2^2)}$$

be both equal to zero for more than an instant, unless $\epsilon_1$ and $\epsilon_2$ are both zero. Accordingly $$\frac{d\mu}{dt}$$

or $\dot{\mu}$ does not vanish unless $\epsilon_1$ and $\epsilon_2$ vanish and therefore $\mu$, $\dot{\mu}$, $\epsilon_1$ and $\epsilon_2$ approach zero together.

Once the angular velocities $w_1$ and $w_2$ of the component sine waves comprising the pitch motion have been determined, the amplitude and phase angle of these sine waves can also be obtained. For example, from Equations 65 and 67, we may eliminate $a_1 \sin(w_1 t + \phi_1)$ and get the relation $$P_0 w_1^2 + P_2 = a_2(w_1^2 - w_2^2) \sin(w_2 t + \phi_2) \qquad (78)$$

Adopting as before, the Formula 20 for the pitch angle of a carrier deck as follows $$P_0 = a_1 \sin(w_1 t + \phi_1) + a_2 \sin(w_2 t + \phi_2)$$

this Formula 20 for purpose of mechanization is written as follows:

$$P_0 - a_2 \sin(w_2 t + \phi_2) = a_1 \sin(w_1 t + \phi_1) \qquad (79)$$

and when applied to the predicted pitch angle, it becomes $$P_p = a_1 \sin[w_1(t + T_p) + \phi_1] + a_2 \sin[w_2(t + T_p) + \phi_2] \qquad (80)$$

Fig. 1 is a diagram showing a pitch angle integrator and differentiator for obtaining the different integrals and derivatives of P; Fig. 2 is a diagram of an angular velocity solver for obtaining the values of the angular velocities $w_1$ and $w_2$ of the two sine wave components constituting the assumed motion of P by mechanization of the Equations 69 and 70 or more specifically 69a and 70a. Fig. 3 is a diagram of a sine wave component synthesizer for obtaining the values $a_1$ and $a_2$ and $\phi_1$ and $\phi_2$, corresponding to the amplitudes and phase angles of the sine wave components of the motion P by mechanization of Equations 78 and 79; and Fig. 4 is a diagram of a pitch prediction computer for mechanizing the Equation 80 after the different values necessary for solution of said equation have been obtained from the mechanisms of Figs. 1, 2 and 3. In all of the drawings of Figs. 1–4, the full lines indicate mechanical motions and especially shaft rotations.

Referring to Fig. 1, the quantity representing the pitch angle P derived as a shaft rotation from the stable element is introduced into a comparison differential 250 in conjunction with the quantity $P_0$ representing the zero derivative of P, to obtain the value $P - P_0 = \epsilon$ (error) which is equal to $$k_1 k_2 k_3 k_4 p^4 + k_2 k_3 k_4 p^3 + k_3 k_4 p^2 + k_4 p)P_0 - k_2 k_3 k_4 p^3 + k_3 k_4 p^2 + k_4 p)P$$

in which $k_1$, $k_2$, $k_3$ and $k_4$ are sensitivity constants or coefficients associated with the four integrators 251, 252, 253 and 254 respectively and $$p = \frac{d}{dt}(\quad)$$

According to the well known Stability Criteria of Routh and Hurwitz, the values of $k_1$, $k_2$, $k_3$ and $k_4$ must always be positive and must conform with these criteria as to the relationship of their magnitudes, according to the degree of equation involved, the degree depending on the number of integrators employed.

The output from the integrator 254 goes into a stabilizing differential 255 in conjunction with the error $\epsilon$ and the output of this differential is employed to set the carriage of the integrator 253. In a similar manner, stabilizing differentials 256 and 257 are employed to obtain the proper feed quantities for the integrators 252 and 251 respectively. As a result, there is obtained the approximate derivative quantities $$P_3 = \frac{d^3P}{dt^3}, \quad P_2 = \frac{d^2P}{dt^2}, \quad P_1 = \frac{dP}{dt}$$

and $P_0$=zero derivative. The difference between P and $P_0$ is a very small error.

The quantity $P_0$, fed into stabilizing differential 258 in conjunction with the output of an integrator 260, results in an output from said differential which is fed into said integrator to obtain the quantity $\int P_0 dt = P_{-1}$ from said integrator. This quantity $P_{-1}$ fed into a stabilizing differential 261 in conjunction with the output of integrator 262 results in an output from said differential which is fed into said integrator to obtain the quantity $\int[\int P_0 dt] dt = P_{-2}$ from said integrator.

The values $P_{-2}$, $P_{-1}$, $P_0$, $P_1$, $P_2$ and $P_3$ obtained as shaft rotations from the mechanism of Fig. 1 as described, are fed into the angular velocity solver shown in Fig. 2 to solve Equations 69 and 70 and more specifically Equations 69a and 70a $$P_{-2}w_1^2w_2^2 + P_0(w_1^2 + w_2^2) + P_2 = \epsilon_1 \rightarrow 0$$
$$P_{-1}w_1^2w_2^2 + P_1(w_1^2 + w_2^2) + P_3 = \epsilon_2 \rightarrow 0$$

to obtain the values $w_1$ and $w_2$. For that purpose, the quantity $P_{-2}$ and the feed-back quantity $w_1^2w_2^2$ obtained in a manner to be described are multiplied together in a unit 270 to obtain the product $P_{-2}w_1^2w_2^2$ which is fed into a differential 271 in conjunction with the quantity $P_0(w_1^2+w_2^2)$ obtained from a multiplier 272, to obtain the quantity $P_{-2}w_1^2w_2^2 + P_0(w_1^2+w_2^2)$. This latter quantity is added to the quantity $P_2$ in a differential 273 to obtain the sum of these quantities, which in the absence of error would be equal to zero according to Equation 69, but which is equal to $\epsilon_1$ according to Equation 69a due to the presence of error, and approaches zero as the revised values of $w_1^2$ and $w_2^2$ are fed back into the system as will be described.

Similarly, the quantity $P_{-1}$ and the feed-back quantity $w_1^2w_2^2$ are multiplied together in a unit 274 and the output of this unit is fed into a differential 275 in conjunction with the quantity $P_1(w_2^2+w_2^2)$ obtained from a multiplier 276 to obtain the quantity $$P_{-1}w_1^2w_2^2 + P_1(w_1^2+w_2^2)$$

This latter quantity is added to the quantity $P_3$ in a differential 277 to obtain the sum of these which in the absence of error would be equal to zero according to Equation 70 but which is equal to $\epsilon_2$ according to Equation 70a due to the presence of error.

To obtain the necessary feed-back for elimination of the errors $\epsilon_1$ and $\epsilon_2$ $P_{-2}$ and $w_2^2$ obtained as will be described, are multiplied together in a unit 278 and the product in conjunction with the quantity $P_0$ (zero derivative of the present pitch angle P) are fed into a differential 280 to obtain $P_{-2}w_2^2 + P_0$ which is fed into a multiplier 281 with $\epsilon_1$ to obtain $\epsilon_1(P_{-2}w_2^2+P_0)$. Similarly, $P_{-1}$ and $w_2^2$ obtained as will be described are multiplied together in unit 282 and the resulting product and $P_1$ are added in differential 283 to obtain $P_{-1}w_2^2+P_1$. The multiplication of the latter quantity by $\epsilon_2$ in unit 284 results in $\epsilon_2(P_{-1}w_2^2+P_1)$. The sum obtained from differential 285 of this latter quantity and the quantity $$\epsilon_1(P_{-2}w_2^2+P_0)$$

obtained as described when multiplied by two by appropriate gear ratios results in the quantity $$\frac{\partial \mu}{\partial(w_1^2)}$$

according to Equation 74. This latter quantity $$\frac{\partial \mu}{\partial(w_1^2)}$$

which is equal to $$-\frac{1}{k_1}\frac{dw_1^2}{dt}$$

from Equation 72 is integrated in unit 286 to attain the quantity $w_1^2$ which is one of the outputs of the angular velocity solver of Fig. 2 desired.

Similarly, $P_{-1}$ and $w_1^2$ obtained as the output of integrator 286 as described, are multiplied together in unit 287 and the product and $P_1$ are added in differential 288 to obtain $P_{-1}w_1^2+P_1$ which is fed into multiplier 290 with $\epsilon_2$ to obtain $\epsilon_2(P_{-1}w_1^2+P_1)$. Also, $P_{-2}$ and $w_1^2$ obtained as the output of integrator 286 as described, are multiplied together in unit 291 and the product and $P_0$ are added in differential 292 to obtain $P_{-2}w_1^2+P_0$. This latter quantity multiplied by $\epsilon_1$ in unit 293 results in $\epsilon_1(P_{-1}w_1^2+P_0)$. The sum obtained by differential 294 of this latter quantity and the quantity $\epsilon_2(P_{-1}w_1^2+P_1)$ obtained as described, when multiplied by two by appropriate gear ratio results in the quantity $$\frac{\partial \mu}{\partial(w_2^2)}$$

according to Equation 75. This equation $$\frac{\partial \mu}{\partial(w_2^2)}$$

which is equal to $$-\frac{1}{k_2}\frac{d(w_2^2)}{dt}$$

from Equation 73 is integrated in unit 295 to obtain the value $w_2^2$ constituting the other output of the angular velocity solver of Fig. 2 desired.

For feed-back, the quantities $w_1^2$ and $w_2^2$ are multiplied together in the unit 296 and the product $w_1^2w_2^2$ is fed to the multipliers 270 and 274. At the same time, the quantities $w_1^2$ and $w_2^2$ are added in a differential 297 and the sum fed into the multipliers 272 and 276.

The quantities $w_1^2$ and $w_2^2$ obtained from the angular velocity solver of Fig. 2 are then fed into the sine wave component synthesizer of Fig. 3 to mechanize Equations 78 and 79 and to obtain the values $a_1$, $a_2$, $\phi_1$ and $\phi_2$ therefrom. In this system, $w_1^2$ and $w_2^2$ are fed into cams 300 and 301 respectively to obtain the square roots of these quantities and the resulting values $w_1$ and $w_2$ are then introduced into integrators 302 and 303 respectively to obtain the quantities $w_1t$ and $w_2t$ therefrom. The quantity $w_1t$ is then added in differential 304 to the quantity $\phi_1$ obtained in a manner to be described, to produce the sum $w_1t+\phi_1$, and the quantity $w_2t$ is added in differential 305 to the quantity $\phi_2$ obtained in a manner to be described, to produce the sum $w_2t+\phi_2$. The quantity $w_2t+\phi_2$ and the quantity $a_2$ obtained in a manner to be described are fed into a resolver 306 to combine these quantities and obtain the quantity $a_2 \sin(w_2t+\phi_2)$. This latter quantity is multiplied in unit 307 by the quantity $w_1^2-w_2^2$ obtained from a differential 308 to obtain the quantity $a_2(w_1^2-w_2^2)\sin(w_2t+\phi_2)$. This latter quantity is subtracted in a differential 309 from the quantity $P_0w_1^2+P_2$ obtained from a differential 310 in a manner to be described, to obtain a difference which should be zero according to Equation 78 but which actually is an error signal representing lack of balance in said equation. This error signal is first integrated in an integrator 311 and then apportioned into appropriate corrections of amplitude $a_2$ and phase angle $\phi_2$ by a component integrator 312 of standard known type. The other input into the integrator 312 is the quantity $w_2 t + \phi_2$ from the differential 305.

The phase angle $\phi_2$ from the integrator 312 goes into the differential 305 and the amplitude $a_2$ from said integrator goes into the resolver 306, to obtain from said resolver the quantity $a_2 \sin(w_2 t + \phi_2)$. Since we now consider $a_2 \sin(w_2 t + \phi_2)$ to be continuously known, this is added in a differential 313 to the quantity $a_1 \sin(w_1 t + \phi_1)$ obtained from a resolver 314, and the sum subtracted from $P_0$ in a differential 315 to obtain in accordance with Equation 79 an error signal which is integrated in unit 316 and then apportioned by a component integrator 317, into which is also fed the quantity $w_1 t + \phi_1$, to obtain the component value $\phi_1$ which goes into differential 304 and component value $a_1$ which goes into resolver 314.

The input $P_0$ goes into multiplier 318 in conjunction with $w_1^2$ to obtain a product which is added to $P_2$ in the differential 310. The quantities $w_1^2$ and $w_2^2$ are subtracted in differential 308 and the difference delivered to the multiplier 307 as described.

The action of the mechanism of Fig. 3 requires further consideration when $w_1 = w_2$. In that case $P_0 w_1^2 + P_2 = 0$ and $w_1 - w_2^2 = 0$ so that we have no error signal. As a result, the values of $a_2$ and $\phi_2$ are indeterminate and may have any values whatever depending on the conditions holding, as $w_2$ approaches $w_1$. We will have therefore a sine wave $a_2 \sin(w_2 t + \phi_2)$ in which $w_2$ only is necessarily correct. Nevertheless, when $a_2 \sin$ $$(w_2 t + \phi_2)$$

is subtracted from $P_0$ to give $a_1 \sin(w_1 t \phi_1)$, the mechanism will still determine correct values of $a_1$ and $\phi_1$. The sum of the two sine waves of equal angular velocity will then of necessity be the same as the single sine wave which represents pitch when $w_1 = w_2 = w$. That is $P_0 = a_1 \sin(wt + \phi_1) + a_2(\sin wt + \phi_2)$
$= (a_1 \cos \phi_1 + a_2 \cos \phi_2) \sin wt + (a_1 \sin \phi_1 + a_2 \sin \phi_2) \cos wt = a \cos \phi \sin wt + a \sin \phi \cos wt = a \sin(wt + \phi)$ where $$a = a_1^2 + a_2^2 + 2a_1 a_2 \cos(\phi_1 - \phi_2)^{1/2}$$

and $$\phi = \tan^{-1}\left[\frac{a_1 \sin \phi_1 + a_2 \sin \phi_2}{a_1 \cos \phi_1 + a_2 \cos \phi_2}\right]$$

All the quantities necessary for obtaining the pitch prediction are now available from the mechanisms of Figs. 1, 2, and 3. Fig. 4 shows the mechanization of the Formula 80

$$P_p = a_1 \sin[w_1(t+T_p) + \phi_1] + a_2 \sin[w_2(t+T_p) + \phi_2]$$

In the pitch prediction computer of Fig. 4, the quantities $w_1$ and $w_2$ obtained from cams in the mechanism of Fig. 3, are fed into two multipliers 325 and 326 respectively, and multiplied therein by the quantity $T_p$ obtained from the prediction time computer described in the aforesaid copending application to obtain the products $w_1 T_p$ and $w_2 T_p$. The quantity $w_1 T_p$ is added in a differential 327 to the quantity $w_1 t + \phi_1$ obtained from the mechanism of Fig. 3, to obtain the quantity $w_1(t+T_p) + \phi_1$. Similarly, the quantity $w_2 T_p$ is added in a differential 328 to the quantity $w_2 t + \phi_2$ obtained from the mechanism of Fig. 3 to obtain the quantity $w_2(t+T_p) + \phi_2$. The quantity $w_1(t+T_p) + \phi_1$ and the quantity $a_1$ obtained from the mechanism of Fig. 3 are fed into a resolver 330 to obtain the quantity $a_1 \sin[w_1(t+T_p) + \phi_1]$ and the quantity $w_2(t+T_p) + \phi_2$ and the quantity $a_2$ obtained from the mechanism of Fig. 3 are fed into a resolver 331 to obtain the quantity $a_2 \sin[w_2(t+T_p) + \phi_2]$. The outputs of the two resolvers 330 and 331 when added in a differential 332 produce the desired predicted pitch angle $P_p$ in accordance with Equation 80.

The mathematics and mechanisms employed in determining the value of pitch angle at the future time $T_p$ is applicable to the determination of the value of the deck height or heave at the future time $T_p$. For that purpose, continuous measurement of the present value of the deck height and its supply as a physical quantity are obtained from a heavemeter operating as an accelerometer and shown and described in the aforesaid application. This quantity is operated on as was the quantity P in the mechanisms of Figs. 1–4, to obtain the deck height at the future time $T_p$.

Although the present invention has been described as embodied in a method and mechanisms for determining pitch angle and heave (deck height), in its broader aspects, the invention is applicable to the determination of a future quantity in a fluctuating system, where the system does not follow continuously a set mathematical form but is changing in mathematical form.

In the following claims, unless otherwise indicated, P and $P_p$ represent broadly the present and future quantities respectively of any fluctuating system.

What is claimed is:

1. A device for continuously predicting the value $P_p$ of a sinusoidal fluctuating system at a predetermined future time $T_p$, comprising means for continuously receiving as an input a signal proportional in value to the present value P of said system, means for continuously creating from said signal, signals proportional in value to the successive integrals and derivatives $$P_{-2} = \int[\int P dt]dt, \ P_{-1} = \int P dt, \ P_0 = \text{zero derivatives of P,}$$

$$P_1 = \frac{dP}{dt}, \ P_2 = \frac{d^2 P}{dt^2}$$

and $$P_3 = \frac{d^3 P}{dt^3}$$

and means for continuously creating a signal proportional in value to the value of $P_p$ by mechanization with the integral and derivative signals the equations $P_{-2} w_1^2 w_2^2 + P_0(w_1^2 + w_2^2) + P_2 = 0$
$P_{-1} w_1^2 w_2^2 + P_1(w_1^2 + w_2^2) + P_3 = 0$
$P_0 w_1^2 + P_2 = a_2(w_1^2 - w_2^2) \sin(w_2 t + \phi_2)$
$P_0 - a_2 \sin(w_2 t + \phi_2) = a_1 \sin(w_1 t + \phi_1)$
$P_0 = a_1 \sin[w_1(t+T_p) + \phi_1] + a_2 \sin[w_2(t+T_p) + \phi_2]$
$P_p = a_1 \sin[w_1(t+T_p) + \phi_1] + a_2 \sin[w_2(t+T_p) + \phi_2]$ wherein $w_1$ and $w_2$ are the angular velocities of the assumed sine wave components of the fluctuating system, $a_1$ and $a_2$ the amplitudes of said sine wave components, $\phi_1$ and $\phi_2$ the phase angles of said sine wave components and $t$ the present running time.

2. A device for continuously predicting the value $P_p$ of a sinusoidal fluctuating system at a predetermined future time $T_p$, comprising means for continuously receiving as an input a signal proportional in value to the present value P of said system, means for continuously creating from said signal, signals proportional in value to the successive integrals and derivatives $$P_{-2} = \int[\int P dt]dt, \ P_{-1} = \int P dt$$

$P_0 = $ zero derivative of P, $$P_1 = \frac{dP}{dt}, \ P_2 = \frac{d^2 P}{dt^2}$$

and $$P_3 = \frac{d^3 P}{dt^3}$$

means for mechanizing with the integral and derivative signals the equations $P_{-2} w_1^2 w_2^2 + P_0(w_1^2 + w_2^2) + P_2 = e_1$
$P_{-1} w_1^2 w_2^2 + P_1(w_1^2 + w_2^2) + P_3 = e_2$ and for stabilizing the action of feed-back in the mechanizing operation to cause the quantities $\epsilon_1$ and $\epsilon_2$ to approach zero with time, whereby signals are obtained proportional to the quantities $w_1$ and $w_2$ respectively, in said equations, $w_1$ and $w_2$ representing the angular velocities of the assumed sine wave components of said fluctuating system, and equation mechanizing means responsive to said $w_1$ and $w_2$ signals to the signals $P_2$, $P_0$ and to a signal proportional to the future time $T_p$ for continuously obtaining a signal proportional in value to the predicted value $P_p$.

3. A device for continuously predicting the value $P_p$ of a sinusoidal fluctuating system at a predetermined future time $T_p$, comprising means for continuously receiving as an input a signal proportional in quantity to the present value P of said system, means for continuously creating from said input signal, signals proportional in value to the successive integrals and derivatives $P_{-2}=\int[\int Pdt]dt$, $P_{-1}=\int Pdt$, $P_0=$zero derivative of P, $$P_1=\frac{dP}{dt}, \quad P_2=\frac{d^2P}{dt^2}$$

and $$P_3=\frac{d^3P}{dt^3}$$

means for continuously mechanizing with the integral and derivative signals the equations $$P_{-1}w_1^2w_2^2+P_1(w_1^2+w_2^2)+P_2=\epsilon_1 \to 0$$
$$P_{-1}w_1^2w_2^2+P_1(w_1^2+w_2^2)+P_2=\epsilon_1 \to 0$$

$$2\epsilon_1(P_{-2}w_2^2+P_0)+2\epsilon_2(P_{-1}w_2^2+P_1)=-\frac{1}{k_1}\frac{d(w_1^2)}{dt}$$

$$2\epsilon_1(P_{-2}w_1^2+P_0)+2\epsilon_2(P_{-1}w_1^2+P_1)=-\frac{1}{k_2}\frac{d(w_2^2)}{dt}$$

to obtain signals proportional to the values $w_1$ and $w_2$ representing the angular velocities of the assumed sine wave components of the fluctuating system, in said equations $\epsilon_1$ and $\epsilon_2$ representing error signals approaching zero with time, and $k_1$ and $k_2$ representing sensitivity or coefficient constants of integrators employed for integrating the quantities $$\frac{d(w_1^2)}{dt}$$

and $$\frac{d(w_2^2)}{dt}$$

and means for continuously mechanizing with the known $w_1$ and $w_2$ signals the equations $$P_0w_1^2+P_2=a_2(w_1^2-w_2^2)\sin(w_2t+\phi_2)$$
$$P_0-a_2\sin(w_2t+\phi_2)=a_1\sin(w_1t+\phi_1)$$
$$P_p=a_1\sin[w_1(t+T_p)+\phi_1]+a_2\sin[w_2(t+T_p)+\phi_2]$$

to obtain a signal proportional in value to the quantity $P_p$, in said latter equations, $a_1$ and $a_2$ represent the amplitudes of said sine wave components, $\phi_1$ and $\phi_2$ the phase angles of said sine wave components and $t$ the present running time.

4. A device for continuously predicting the pitch angle $P_p$ of a floating deck at a predetermined future time $T_p$ as described in claim 3, wherein P represents the present pitch angle, $w_1$ and $w_2$ the angular velocities of the assumed sine wave components of the pitch angle variations, $a_1$ and $a_2$ the amplitudes of said sine wave components, and $\phi_1$ and $\phi_2$ the phase angles of said sine wave components.

5. A device for continuously predicting the height of a floating deck at a predetermined future time $T_p$ as described in claim 3, wherein P represents the present deck height, $w_1$ and $w_2$ the angular velocities of the assumed sine wave components of the deck height variations, $a_1$ and $a_2$ the amplitudes of said sine wave components, and $\phi_1$ and $\phi_2$ the phase angles of said sine wave components.

6. A device for continuously predicting the value of a quantity in a sinusoidal fluctuating system at a predetermined future time $T_p$, which comprises means for continuously determining the successive integrals and successive derivatives of the present value P of the quantity where the present value of the quantity follows the sinusoidal relationship $$P=a_1\sin(w_1t+\phi_1)+a_2\sin(w_2t+\phi_2)$$

wherein $w_1$ and $w_2$ represent the angular velocities of the assumed sine wave components of the fluctuating system, $a_1$ and $a_2$ the amplitudes of said sine wave components, $\phi_1$ and $\phi_2$ the phase angles of said sine wave components and $t$ the present running time, means responsive to said successive integrals and successive derivatives quantities as inputs for mechanizing equations corresponding to the values of said successive integrals and successive derivatives for obtaining continuously the quantities $w_1$, $w_2$, $a_1$, $a_2$, $\phi_1$ and $\phi_2$, and means responsive to the quantities $w_1$, $w_2$, $a_1$, $a_2$, $\phi_1$, $\phi_2$ and $T_p$ for continuously mechanizing the equation $$P_p=a_1\sin[w_1(t+T_p)+\phi_1]+a_2\sin[w_2(t+T_p)+\phi_2]$$

for obtaining the quantity $P_p$.

References Cited in the file of this patent
UNITED STATES PATENTS 2,404,011     White _____ July 16, 1946

OTHER REFERENCES

"Some Aspects of Electrical Computing" (Part 1), by J. Bell, Electronic Engineering, July 1951, pages 213–269.